United States Patent Office 3,122,581
Patented Feb. 25, 1964

3,122,581
PREPARATION OF PHOSPHORUS-CONTAINING ORGANOSILICON COMPOUNDS
Roscoe A. Pike, Grand Island, N.Y., assignor to Union Carbide Corporation, a corporation of New York
No Drawing. Continuation of application Ser. No. 782,379, Dec. 23, 1958. This application Oct. 27, 1961, Ser. No. 148,035
4 Claims. (Cl. 260—448.8)

This invention relates in general to novel processes for the production of phosphorus-containing organosilicon compounds and to novel compounds produced thereby. More particularly, this invention is concerned with processes for the production of phosphorus-containing organosilicon compounds wherein the phosphorus is bonded to the silicon atom through a saturated divalent aliphatic or alicyclic hydrocarbon group containing at least two carbon atoms. This invention is also concerned with novel phosphorus-containing organosilicon compounds produced by said processes.

One of my novel processes in its broadest sense involves the reaction of a phosphorus compound containing one trivalent or quinquevalent phosphorus atom which has at least one hydrogen bonded to phosphorus, with a silicon compound containing at least one silicon atom and at least one ethylenically unsaturated aliphatic or alicyclic hydrocarbon group attached to the silicon. The process is preferably carried out under the influence of a catalyst which encourages the addition of the phosphorus compound to the double bond of the ethylenically unsaturated aliphatic or alicyclic hydrocarbon group of the silicon compound and improves the yield of the phosphorus-containing organosilicon compound product.

The reaction is represented by the equation:

where Y—H is the phosphorus compound starting material, Y being a group selected from the class consisting of =P— and =P(O)— groups, A—Si≡ is the silicon compound starting material wherein A is a monovalent ethylenically unsaturated aliphatic or alicyclic hydrocarbon group having from 2 to 18 carbon atoms and Y—Z—Si≡ is the phosphorus-silicon product wherein Z is a divalent saturated aliphatic or alicyclic hydrocarbon group preferably having not more than 18 carbon atoms.

The phosphorus compounds employed as starting materials in my process are those containing one trivalent or quinquevalent phosphorus atom to which is bonded at least one hydrogen atom. These phosphorus compounds are represented by the formula:

where Y has the above-defined meaning, i.e., Y is a =P— group or a =P(O)— group, each remaining unfilled valence of phosphorus, other than the valence satisfied by the hydrogen, being satisfied by no other group than hydrogen, hydrocarbyl, hydrocarbyloxy, halohydrocarbyl and halohydrocarbyloxy groups. By the term "hydrocarbyl," as employed herein, is meant a monovalent hydrocarbon group, i.e., a monovalent group composed of carbon and hydrogen. Thus, halohydrocarbyl designates a monovalent hydrocarbon group which is substituted with halogen, i.e., XR''' where X is halogen and R''' is the hydrocarbon group; hydrocarbyloxy designates a monovalent hydrocarbon group attached to ether oxygen, i.e., R'O— where R' is the hydrocarbyl group, and halohydrocarbyloxy designates a monovalent hydrocarbon group which is substituted with halogen and attached to ether, oxygen, i.e., XR'''O—.

The silicon compounds employed as starting materials herein contain at least one silicon atom and at least one unit of the formula:

wherein A is as defined above and each silicon atom is bonded to from one to three oxygen atoms which are bonded to no other element than silicon or carbon of a hydrocarbyl group and each remaining unfilled valence of each silicon atom being satisfied by no other group than A, a monovalent hydrocarbon group or a halogenated monovalent hydrocarbon group.

Mole ratios of the phosphorus compound and silicon compound, employed as starting materials in the process of this invention, are not narrowly critical. Stoichiometric amounts as shown by the above equation are preferred for efficient reaction and ease of product recovery. For example, one mole of the phophorus compound is preferred for each mole of ethylenic unsaturation in the silicon compound desired to be reacted. Other than stoichiometric amounts of the phosphorus compound and of the ethylenically unsaturated silicon compound can also be used. In calculating stoichiometric amounts of phosphorus compounds having 2 or more hydrogen atoms bonded thereto for the purpose of this invention, only one such phosphorus-bonded hydrogen atom takes part in the reaction with each ethylenically unsaturated hydrocarbon group of the silicon compounds.

The catalysts which can be advantageously employed in the process of this invention include the free radical producing catalysts, e.g., the organic peroxides and azo compounds. Specific examples of organic peroxide catalysts operative herein include ditertiary-butyl peroxide, dibenzoyl peroxide, diacetyl peroxide, dicumyl peroxide, tertiary-butyl peracetate, tertiary butyl perbenzoate and the like. Specific examples of azo compounds which are used herein include alpha, alpha-azo diisobutyronitrile, 2,2'-dicyanoazobenzene and the like. Other catalysts such as the potassium catalysts including metallic potassium, potassium organic complexes, potassium alkoxides and the like can also be employed as catalysts. The concentration of catalyst is not narrowly critical. Advantageous catalyst concentrations are those in the range from 0.5 to 10 percent by weight based on the weight of the starting materials, i.e., the ethylenically unsaturated organosilicon compound and phosphorus compound. A catalyst concentration of 2–10 percent by weight based on the weight of the starting materials is preferred.

The temperatures at which the process of this invention is carried out can range from 50° C. to 250° C. depending upon the rate of decomposition of the particular free radical catalyst, if one is used. The temperature must be sufficiently elevated to form free radicals from the catalyst and should be chosen so that the free radical formed has a reasonable half-life. With the more active organic peroxide catalysts such as, for example, dibenzoyl peroxide, tertiary-butyl perbenzoate and the like, temperatures of from 50° C. to 100° C. are preferred. When a less active organic peroxide catalyst is used, for example, ditertiary-butyl peroxide, temperatures of from 100° C. to 180° C. can be used. However, with the latter catalyst a temperature range of from 120° C. to 160° C. is preferred.

The pressure at which the process of this invention is carried out is not narrowly critical. Pressures above or below atmospheric can be used if desired; however, it is preferred for convenience that the process be carried out at atmospheric pressure. When one or more of the reactants is too volatile for practical reaction at atmospheric pressure, the reaction can conveniently be run at superatmospheric pressure in a pressure vessel. When a phosphine is used as a reactant, it is preferred that the reaction be carried out in an inert atmosphere such as in argon or nitrogen to prevent oxidation of the phosphine by atmospheric oxygen.

A solvent is not necessary in the process of this invention; however, a solvent can be employed as desired for convenience and ease of handling. For example, when high molecular weight ethylenically unsaturated polysiloxanes are used as the silicon compound starting material, a solvent can be advantageously employed to provide a homogenous system. The solvent employed should be selected so that it is non-reactive toward the reactants and catalysts. Solvents such as benzene, toluene, and the like are useful.

The silicon compound satrting materials used in the practice of the present invention are organosilicon compounds containing at least one unit of the formula:

wherein A is defined above, each Si atom is bonded as described above, and the remaining unfilled valences of each silicon is satisfied as described above. For example, A can be vinyl, allyl, butenyl, decenyl, octadecenyl and the like, or A can be an alicyclic group containing ethylenic unsaturation such as cyclohexenyl, bicycloheptenyl and the like.

Thus, the silicon compound starting materials used in this invention include organosilanes which are mono-, di- and trifunctional in regard to the silicon atom. These organosilanes are those having the formula:

(A)    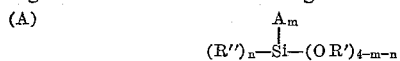

where A has the above-defined meaning, R'' is a monovalent hydrocarbon radical or a halogenated monovalent hydrocarbon radical, R' is a monovalent hydrocarbon radical, $n$ is an integer of from 0 to 2, $m$ is an integer of from 1 to 3 and the sum of $m+n$ is not greater than 3. Illustrative of the monovalent hydrocarbon radicals as represented by R' and R'' are methyl, ethyl, stearyl, cyclohexyl, phenyl, naphthyl, phenylethyl, ethylphenyl and the like. Illustrative of the halogenated monovalent hydrocarbon radicals as represented by R'' are the halogenated derivatives of the monovalent hydrocarbon radicals illustrated above, for example, chloropropyl, bromophenyl, fluorophenyl and the like. Wherever employed herein, the radicals represented by R' and R'' preferably each contain from 1 to 18 carbon atoms. Organosilanes which are monofunctional insofar as the silicon atom is concerned are, for example, vinyl(dimethyl)ethoxysilane, butenyl(diethyl)propoxysilane, vinyl(diphenyl)ethoxysilane and the like. Organosilanes which are difunctional insofar as the silicon atom is concerned are, for example, the dialkoxysilanes such as phenyl(vinyl)diethoxysilane, methyl(allyl)dipropoxysilane, methallyl(ethyl)dimethoxysilane, butenyl(methyl)diethoxysilane and the like. Organosilanes which are trifunctional insofar as the silicon atom is concerned are, for example, the trialkoxysilanes such as vinyltriethoxysilane, allyltrimethoxysilane, cyclohexenyltriethoxysilane, butenyltripropoxysilane, methallyltriethoxysilane, 9-octadecenyltriethoxysilane and the like.

The silicon compound starting materials used in the present invention also include polysiloxanes containing at least one unit of the formula:

(B)    

wherein R'', A, $m$ and $n$ have the above-defined meanings. These polysiloxanes include those composed of only units of the above Formula B and in addition, those containing at least one unit of the above Formula B interconnected with each other and units represented by the formula:

(C)    $R''_xSiO_{\frac{4-x}{2}}$ where R'' is as defined above and $x$ is an integer of from 0 to 3. Wherever employed herein in describing polysiloxanes, the integers as represented by $m$, $n$ and $x$ each individually can be the same or different throughout the same polysiloxane molecule but must be the same throughout the same siloxane unit. The symbols R, R', R'', A, Z and Y, also wherever employed herein describing phosphorus compounds, polysiloxanes and/or silanes, each can be the same or different throughout the same molecule. Examples of polysiloxanes which are employed as starting material herein include the crosslinked or trifunctional polysiloxanes, e.g., vinylpolysiloxane, cyclohexenylpolysiloxane, allylpolysiloxane and the like; difunctional polysiloxanes, e.g., cyclic siloxanes such as tetramethyltetravinylcyclotetrasiloxane, tetraallyltetraphenylcyclotetrasiloxane and the like, and linear siloxanes such as methyl(vinyl)polysiloxane, cyclohexenyl(ethyl)-polysiloxane and the like; trifunctional copolymers of phenylpolysiloxane and vinylpolysiloxane, ethylpolysiloxane and allylpolysiloxane, methylpolysiloxane and cyclohexenylpolysiloxane and the like; or difunctional cyclic or linear copolymers such as the cyclosiloxanes, e.g., cyclohexenylheptamethylcyclotetrasiloxane, divinylhexamethylcyclotetrasiloxane, allylpentamethylcyclotetrasiloxane and the like; or linear copolymers of phenylvinylsiloxane and dimethylsiloxane, linear copolymers of allylmethylsiloxane and diethylsiloxane and the like, and the linear trihydrocarbylsiloxy end-blocked siloxanes such as a trimethylsiloxy end-blocked copolymer of phenylmethylsiloxane and methylvinylsiloxane, and triphenylsiloxy end-blocked copolymer of methylcyclohexenylsiloxane and dimethylsiloxane and the like.

The phosphorus compounds employed as starting materials are those described above and include phosphines, phosphine oxides, phosphinites, phosphinates, phosphonites and phosphonates. The phosphines are illustrated by methyl(ethyl)phosphine, dipropylphosphine, diphenylphosphine, di(cyclohexyl)phosphine, bromoethyl(phenyl)phosphine, iso-amylphosphine, benzylphosphine, (2,4,5 - trimethylphenyl)phosphine, (2 - chlorophenyl)phosphine, $(CH_3)_2PH$, $(C_2H_5)_2PH$, $(CH_3)(isopropyl)PH$, $[(CH_3)_2CH]_2PH$, $(C_2H_5)(C_4H_9)PH$, $(C_4H_9)_2PH$, $[(CH_3)_2CH][C_2H_5(CH_3)CH]PH$ (isoamyl)$_2$PH, (isobutyl)$_2$PH, $(CH_3)(C_6H_5)PH$, $(C_2H_5)(C_6H_5)PH$ $(C_6H_5CH_2)_2PH$, $(C_6H_5)_2PH$, $(CH_3C_6H_4)_2PH$, $(C_6H_5)(4-CH_3-C_6H_4)PH$ (Naphthyl)$_2$PH and the like, and are represented by the formulas, R—PH$_2$ and R$_2$PH. Wherever employed herein, R is a monovalent hydrocarbon group or a monovalent hydrocarbon group which is substituted with halogen and preferably contains from 1 to 18 carbon atoms. Phosphine oxides are illustrated by

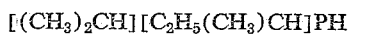
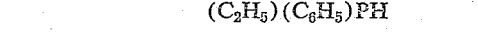
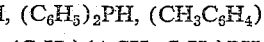

and the like and are represented by the formulas RP(O)H$_2$ and R$_2$P(O)H. Phosphinites are represented by the formulas (RO)PH$_2$ and (RO)RPH and are illustrated by $(C_6H_5O)PH_2$, $(C_6H_5O)C_2H_5PH$, $(C_2H_5)(C_8H_{17}O)PH$ $(C_4H_9O)(C_6H_5)PH$ and the like. Phosphinates are represented by the formulas (RO)P(O)H$_2$, and (RO)RP(O)H and are illustrated by $(C_6H_5O)P(O)H_2$, (xylyloxy)P(O)H$_2$ $(C_6H_5)(C_8H_{17}O)P(O)H$, $(C_2H_5)(C_6H_5)P(O)H$, $(C_4H_9O)(C_6H_5)P(O)H$ Phosphonites are represented by the formula $(RO)_2PH$ and are illustrated by $(C_6H_5O)_2PH$. Phosphonates are represented by the formula $(RO)_2P(O)H$ and are illustrated by $(C_2H_5O)(C_6H_{13}O)P(O)H$, $(C_4H_9O)_2P(O)H$, $(CH_3O)_2P(O)$, $(C_2H_5O)_2P(O)H$, $(C_8H_{17}O)_2P(O)H$, $(C_6H_5O)_2P(O)H$, $(xyloxy)_2P(O)H$, $(ClCH_2CH_2O)_2P(O)H$ $(4\text{-Cl-}C_6H_4O)_2P(O)H$, and the like. The preferred phosphorus compound starting materials are the phosphines, phosphine oxides, phosphinites having only one phosphorus-bonded hydrogen, phosphinates and phosphonites, i.e., those represented by the formula $$R_{2-p}(RO)_pMH$$

where R is as previously defined, $p$ is an integer of 0 or 1 and M is a phosphinylidyne group, $=P(O)-$, or a phosphinidyne group, $=P-$. The nomenclature employed herein to designate phosphorus compounds is in accordance with the rules for naming compounds containing one phosphorus atom as approved by the general nomenclature committee of the Organic Division of the American Chemical Society and as published in Chemical and Engineering News, volume 30, Number 43, pages 4515 through 4522 (October 27, 1952). The use of "(O)" in the formulas herein designates oxygen which is bonded to only phosphorus, e.g., P=O, and no differentiation is being made herein between →O (or semi-polar linkage) and =O (or double bond linkage). In many instances the phosphonates exist in the tautomeric form as the diesters of phosphorus acid, e.g. $(RO)_2POH$. In these instances such diesters are equivalent to the phosphonates and are used in place of said phosphonates in my process.

The phosphorus-containing organosilicon compounds produced by my process are those containing at least one unit of the formula:

$$Y-Z-Si\equiv$$

where Y and Z are as previously described, each silicon is bonded as described above and the unfilled valences of each silicon are satisfied as previously described. These phosphorus-containing organosilicon compounds are monomeric, polymeric and copolymeric and include the hydrolyzable silanes and the polysiloxanes.

The monomeric phosphorus-containing organosilicon compounds produced by the process of this invention include the hydrolyzable phosphorus-containing organosilanes represented by the general formula:

(1)
$$[Y-Z-]_m\underset{\underset{R''_n}{|}}{Si}-(OR')_{4-n-m}$$

where Y, Z, R', R'', $m$ and $n$ have the above-defined meanings.

The polymeric phosphorus-containing organosilicon compounds produced by the process of this invention include the phosphorus-containing organopolysiloxanes containing the unit represented by the formula:

(2)
$$[Y-Z-]_m\underset{\underset{R''_n}{|}}{Si}O_{\frac{4-n-m}{2}}$$

where Y, Z, R'', $m$ and $n$ have the above-defined meanings. The phosphorus-containing organopolysiloxanes produced by the process of this invention include those phosphorus-containing organosiloxanes having only units of the Formula 2, and in addition, those phosphorus-containing organosiloxanes having at least one unit of the Formula 2 in combination with one or more unit of the Formula C. These phosphorus-containing organopolysiloxanes include the linears, cyclics and cross-linked polysiloxanes.

The new hydrolyzable phosphorus-containing organosilanes of the instant invention are depicted by the formula:

(3)
$$\left[RO-\underset{\underset{O}{|}}{\overset{\overset{O}{||}}{P}}-Z'\right]_m\underset{\underset{(R'')_n}{|}}{Si}-(OR')_{4-m-n}$$

wherein R, R', R'', $n$, $m$ and $m+n$ are as previously defined and Z' is a divalent aliphatic hydrocarbon group having from 2 to 18 carbon atoms. These organosilanes include, for example,

[beta-(dimethoxyphosphinyl)ethyl]triethoxysilane,
[gamma-(di-(2-ethylhexoxy)phosphinyl)propyl]trimethoxysilane,
[(ethoxy)hexoxyphosphinylbutyl]methyldipropoxysilane,
[beta-(butoxy)amyloxy)phosphinyl)ethyl]phenyldiethoxysalane.
[beta-(diethoxyphosphinyl)ethyl]triethoxysilane,
[beta-(dibutoxyphosphinyl)ethyl]triethoxysilane,
[beta-(diethoxyphosphinyl)ethyl]methyldiethoxysilane,
[beta-(dimethoxyphosphinyl)ethyl]methyldiethoxysilane,
[gamma-(diethoxyphosphinyl)propyl]triethoxysilane,
[beta-(di-2-ethylhexoxyphosphinyl)ethyl]methyldiethoxysilane,
[beta-(dimethoxyphosphinyl)ethyl]phenyldiethoxysilane,
[beta-(dimethoxyphosphinyl)ethyl]dimethylethoxysilane,
[beta-(diphenoxyphosphinyl)ethyl]triethoxysilane,
[beta-(diphenoxyphosphinyl)ethyl]methyldiethoxysilane,
[beta-(diphenoxyphosphinyl)ethyl]dimethylethoxysilane,
(dimethoxyphosphinylbutyl)triethoxysilane,
(dimethoxyphosphinylpropyl)triethoxysilane,
[beta-(bis(beta-chloroethoxy)phosphinyl)ethyl]phenyldiethoxysilane,
[beta-(dibutoxyphosphinyl)ethyl]diphenylethylsilane,
bis-[beta-(dibutoxyphosphinyl)ethyl]diethoxysilane,
and the like.

As an alternative process the phosphorus-containing organosilicon compounds described herein, where, however, Y is a group represented by the formula $$(R'O)_yR'_{2-y}P(O)-$$

where R' is as previously defined and $y$ is an integer of 0 to 2, can also be made by reacting a hydrocarbyloxyphosphine with a halohydrocarbylsilicon compound. The reaction for clarity is referred to herein as the metathetical reaction and the process as the metathetical process. The metathetical reaction is represented by the equation:

(II)
$$R'_{3-q}P(OR')_q + [X-Z-]Si\equiv \longrightarrow \left[\underset{\underset{R'_{2-y}}{}}{\overset{(R'O)_y\diagdown\overset{O}{||}}{\diagup}}PZ\right]Si\equiv + R'X$$

wherein R', $y$, Z and X are as previously defined and $q$ is an integer from 1 to 3. The hydrocarboxyloxyphosphine is represented by $R'_{3-q}P(OR')_q$. The halohydrocarbylsilicon compound is represented by $XZSi\equiv$.

The hydrocarbyloxyphosphines are illustrated by the trihydrocarbyl phosphites including trimethyl phosphite, $(CH_3O)_3P$, triethyl phosphite, $(C_2H_5O)_3P$, tristearyl phosphite, $(C_{18}H_{37}O)_3P$, triphenyl phosphite, $(C_6H_5O)_3P$, and the like; the dihydrocarbyl hydrocarbylphosphonites including diphenyl ethylphosphonite, $(C_2H_5)P(OC_6H_5)_2$, diphenyl phenylphosphonite, $(C_6H_5)P(OC_6H_5)_2$, diethyl propylphosphonite, $(C_3H_6)P(OC_2H_5)_2$, dimethyl stearylphosphonite, $(C_{18}H_{37})P(OCH_3)_2$, and the like; the hydrocarbyl dihydrocarbylphosphinites including ethyl methylethylphosphinite, $(CH_3)(C_2H_5)P(OC_2H_5)$, methyl diphenylphosphinite, $(C_6H_5)_2P(OCH_3)$, benzyl diphenylphosphinite, $(C_6H_5)_2P(OCH_2C_6H_5)$, ethyl di(4-methylphenyl)phosphinite, $(4\text{-}CH_3C_6H_4)_2P(OC_2H_5)$ and the like.

The halohydrocarbylsilicon compounds include the halohydrocarbylsilanes represented by $XZSi\equiv$ where from 1 to 3 valences of silicon are satisfied by hydrocarbyloxy groups and each remaining valence of Si is filled by an XZ— group or an R″— group. Illustrative of the halohydrocarbylsilanes are chloromethyltrimethoxysilane, bis (chloromethyl) methylethoxysilane, chloroethyl(phenyl)diethoxysilane, iodoethyltriethoxysilane, gamma-chloropropyltriethoxysilane, and the like. Also included are the halohydrocarbylpolysiloxanes containing two or more silicon atoms interconnected by SiOSi linkages and containing at least one XZ— group bonded to silicon, remaining valences of silicon other than those filled by XZ— groups and SiOSi linkages being satisfied by R″— groups. Illustrative of the halohydrocarbylpolysiloxanes are the linear halohydrocarbylsiloxanes, e.g., chlormethylpentamethyldisiloxane; cyclic halohydrocarbylsiloxanes, e.g., bromomethylheptamethylcyclotetrasiloxane; the cross-linked halohydrocarbylsiloxane, e.g., poly(chloropropylsiloxane) and the like.

The metathetical process is simply carried out by mixing the hydrocarbyloxy phosphine starting material and the halohydrocarbylsilicon compound starting material and heating the mixture. As shown by Equation II a hydrocarbon halide R′X is formed as a by-product of the reaction. Since the hydrocarbon halide is a relatively volatile material, it is easily removed by heating. The temperature of reaction is not narrowly critical although it should be sufficiently high to cause the formed hydrocarbon halide to volatilize and to allow a reasonable time to complete the reaction. The reaction temperature depends upon the particular starting materials employed. However, refluxing of the reaction mixture at atmospheric pressure has been found to generally provide a suitable temperature. As shown by Equation II stoichiometry requires one mole of the hydrocarbyloxy phosphine for each halogen of the XZ— group desired to be reacted. The stoichiometric amounts of starting materials are preferred, although more or less of one or the other of the starting materials can be employed. The phosphorus-containing organosilicon compound obtained as product is isolated by conventional means, for example, by fractional distillation when the product is sufficiently volatile, by stripping low boiling materials to obtain the product as residue when the product is relatively high boiling or by filtration and/or crystallization when the product is solid.

The phosphorus-containing organosilicon compounds made by the processes of this invention are useful as lubricants and lubricant additives. These compounds are also useful as intermediates in the preparation of polysiloxane oils, resins, and elastomers which are useful as lubricant and coating materials. The hydrolyzable phosphorus-containing silanes made by the process of this invention can by hydrolyzed and condensed, alone or with other hydrolyzable silanes, $R_x''Si(OR')_{4-x}$, to form cyclic, linear and cross-linked polysiloxanes, containing units of the Formula 2 alone or in combination with units of the Formula C. Hydrocarbyloxy groups or halohydrocarbyloxy groups, R′O—, bonded to phosphorous of the hydrolyzable phosphorous-containing silanes can also be made to hydrolyze during hydrolysis and condensation to the polysiloxane. Silicon-bonded hydrocarbyloxy groups have been found to hydrolyze more readily than phosphorus-bonded hydrocarbyloxy or halohydrocarbyloxy groups. Thus, phosphorus-containing polysiloxanes having all, some or none of its phosphorus-bonded hydrocarbyloxy or halohydrocarbyloxy groups, if any, hydroylzed to hydroxy groups can be prepared by the hydrolysis and condensation of the hydrolyzable phosphorus-containing organosilanes (Formula 1) made by the process of this invention under controlled conditions. Phosphorus-bonded hydroxy groups formed by the hydrolysis of phosphorus-bonded hydrocarbyloxy or halohydrocarbyloxy groups are reactive and can be caused to condense with silicon-bonded hydroxyl groups or other phosphorus-bonded hydroxyl groups to form cross-linked resins. The phosphorus-containing organosiloxanes made by the process of this invention or by hydrolysis and condensation of the hydrolyzable phosphorus-containing organosilanes are useful in the form of linear oils in electrical applications wherein a constant dielectric strength and a low power factor at the higher frequencies are desired. For example, the linear oils are useful in the manufacture of capacitors. The hydrolyzable phosphorus-containing organosilanes are also capable of providing flame-resistant properties to materials treated therewith. Illustratively, silk, nylon and cotton coth when treated wih an aqueous acoholic solution of the phosphorus-containing organosilanes and a cloth sizing agent impart thereto a higher ignition temperature, greater after-glow quenching properties and less tendency to carbonize. The hydrolyzable phosphorus-containing organosilanes are also useful as anti-static agents for various materials. For example, cloth treated therewith exhibits anti-static properties.

The following examples serve to further illustrate my invention and are not to be construed as limitations thereon:

*Example 1*

The reaction was carried out in a 1000 ml. round-bottom flask fitted with a reflux condenser, drying tube and dropping funnel. Dimethyl phosphonate, $$(CH_3O)_2P(O)H$$

(2.0 moles, 220 g.) was placed in the flask and heated to 140° C. A mixture of di-t-butyl peroxide (19.2 g.) in methyl(vinyl)diethoxysilane, (2.0 moles, 320 g.) was added from the dropping funnel over a 1-hour period while the temperature was maintained at 140–160° C. Heating was continued for 1 hour after the addition was complete. The reaction mixture was fractionated in a short column packed with glass helices. [Beta-(dimethoxyphosphinyl)ethyl]methyldiethoxysilane (389.8 g., 72% yield),

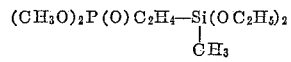

was obtained. Elemental analysis gave the following results:

Found: C, 40.0; Si, 10.6; P, 11.5; M.W. 370. Calculated: C, 40.0; Si, 10.4; P, 11.5; M.W. 270.

The compound was verified as being [beta-(dimethoxyphosphinyl)ethyl]methyldiethoxysilane by infrared and elemental analysis. [Beta-(dimethoxyphosphinyl)ethyl]methyl diethoxysilane was found to boil at about 125.5 to 129° C. at 3.0 mm. Hg and have an $n_D^{25}$ of 1.4288.

*Example 2*

The reaction was carried out in a 1-liter round-bottom flask fitted with a reflux condenser and a drying tube. Methyl(vinyl)diethoxysilane (1.0 mole, 160 g.) di-2-ethylhexyl phosphonate, $(C_8H_{17}O)_2P(O)H$, (1.32 moles, 404.3 g.) and di-tertiarybutyl peroxide (12.0 g.) were charged to the flask and heated slowly to 140° C. The temperature then rapidly rose to 195° C. and slowly dropped. Heat was applied to maintain the flask contents at 170° C. for 5 hours. A single plate distillation gave 379.4 g. of a liquid material which was then distilled through a Vigreaux column to give 196 g. of a residue product. Infra-red analysis and elemental analysis identified the product as [beta-(di-2-ethylhexoxyphosphinyl)ethyl]methyldiethoxysilane,

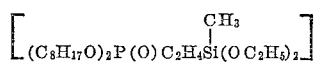

Elemental analysis provided the following results:

|  | Si | P | Mol. Wt. |
|---|---|---|---|
| Theory | 6.0 | 6.6 | 566 |
| Found | 5.8 | 6.2 | 565 |

*Example 3*

Dimethyl phosphonate (220 g., 2.0 moles) was charged into a 1-liter, three-necked, round bottom flask fitted with a mechanical stirrer, dropping funnel, drying tube, and a reflux condenser. The phosphonate was heated to 140° C. A mixture of vinyltriethoxysilane (380 g., 2.0 moles) and ditertiarybutyl peroxide (19.2 g.) was placed in the dropping funnel and added to the heated phosphonate over a 1-hour period with stirring while maintaining the temperature between 140° C. and 160° C. The heating was continued for an additional hour after the addition was completed. The mixture was distilled through a Vigreaux column to yield [(dimethoxyphosphinyl)ethyl]-triethoxysilane, (374 g., 62.3% yield) (B.P. 142.5–143° C. at 5.5 mm. Hg, $n_D^{25}$ 1.4230), which gave the following analysis:

Calculated for $C_{10}H_{25}SiO_6P$: 10.3% P; 9.35% Si. Found: 10.0% P; 9.1% Si.

*Example 4*

To a 1-liter round-bottomed flask equipped with motor stirrer, addition funnel and reflux condenser was charged phenylphosphine $(C_6H_5PH_2)$, (42.0 g., 0.38 mole) and toluene (50 ml.). The system was placed under nitrogen atmosphere and the mixture brought to 150° C. The addition funnel was charged with a solution of vinyltriethoxysilane (72.5 g., 0.38 mole) and di-t-butyl peroxide (9.2 g.). In a dropwise fashion, with good stirring, the silane mixture was added to the reaction flask over a 1-hour period. Heating at 150° C. was continued for three hours after addition. The reaction mixture was chilled to room temperature under nitrogen.

The reaction product was transferred to a 500 ml. single-necked, round-bottomed flask using nitrogen. The flask was attached to a ten-inch Vigreaux column with distilling head and cold trap and distilled under reduced H pressure. Beta-phenylphosphinoethyltriethoxysilane $[(C_6H_5)P-H-C_2H_4Si(OC_2H_5)_3]$ was isolated as the distillate (B.P. 157–161° C. at 2.5 mm. Hg, $n_D^{25}$ 1.4844) in 25 mole percent to yield and gave the following analysis:

Calculated for $C_6H_5PHC_2H_4Si(OC_2H_5)_3$: Si 9.6%. Found: Si 9.6%.

The structure of the compound was verified by infrared analysis.

*Example 5*

To a 500 cc. flask equipped with mechanical stirrer, dropping funnel, thermometer and reflux condenser was added diphenylphosphine, $(C_6H_5)_2PH$, (0.08 mole, 15.5 g.). A solution of vinyl(methyl)diethoxysilane (0.083 mole, 13.3 g.) and di-tertiarybutyl peroxide (2.0 g.) was added dropwise while maintaining the reaction mixture at 140–156° C. Finally, the mixture was heated to 174° C. for 45 minutes and then cooled. The mixture was fractionated through a 12″ x ¾″ packed fractionating column. Fraction 3 weighed 6.7 g., B.P. 166–139° C./0.06 mm. Hg, $n_D^{25}=1.5510$. Fraction 4 weighed 5.9 g., B.P. 137–151/0.05 mm., $n_D^{25}=1.5496$. These two fractions represent a 44% yield of (diphenylphosphinoethyl)-methyldiethoxysilane, $(C_6H_5)_2PC_2H_4Si(CH_3)(OC_2H_5)_2$, which gave the following analysis:

Calculated for $C_{19}H_{27}SiPO_2$: Si, 8.1; P, 8.9. Found for Fraction 4: Si, 7.8; P, 9.0.

*Example 6*

To a 500 cc. flask equipped with water reflux condenser, mechanical stirrer, thermometer and dropping funnel was added phenyl(butyl)phosphine, $(C_6H_5)(C_4H_9)PH$ (0.113 mole, 18.8 g.). The phosphine was heated to 120° C. A solution of vinyltriethoxysilane (0.113 mole, 21.5 g.) and di-tertiarybutyl peroxide (2.8 g.) was then added to the phosphine. During the addition (one hour) the temperature was maintained at 120–150° C. The reaction mixture was then heated for two hours at 150–162° C. The reaction product was distilled under reduced pressure through a 12″ x ¾″ fractionating column packed with "Heli-Pak." [Butyl(phenyl)phospinoethyl]triethoxysilane, $(C_6H_5)(C_4H_9)PC_2H_4Si(OC_2H_5)_3$, (B.P. 126° C. at 0.25 mm. Hg, $n_D^{25}$ 1.4911) was obtained in 53% yield. This product gave the following analysis:

Calculated for $C_{13}H_{33}SiPO_3$: Si, 7.9; P, 8.7. Found: Si, 7.6; P, 8.3.

*Example 7*

To a 500 cc. flask equipped with dropping funnel, mechanical stirrer, reflux condenser and thermometer was added octyl phenylphosphinate, $(C_6H_5)(C_8H_{17}O)P(O)H$, (0.2 mole, 50.8 g.). The phosphinate was heated to 140° C. A solution of vinyltriethoxysilane (0.2 mole, 38.0 g.) and di-tertiarybutyl peroxide was added dropwise while the reaction mixture was maintained at 140–155° C. The reaction mixture was then heated to 166° C. and maintained at this temperature for 1½ hours. The mixture was fractionated through a 12″ x ¾″ column packed with "Heli-Pak" and [(phenyl)octyloxyphosphinylethyl]-triethoxysilane $[C_6H_5(C_8H_{17}O)P(O)C_2H_4Si(OC_2H_5)_3]$ (60.9 g., $n_D^{25}$ 1.4770–1.4802, B.P. 211–215° C. at 1.0 mm. Hg) was obtained in 69% yield. This product gave the following analysis:

Calculated for $C_{22}H_{41}SiPO_5$: 6.3% Si; 7.0% P. Found: 5.6% Si; 6.8% P.

*Example 8*

A reaction flask was charged with dimethyl phosphonate (330 g., 3.0 moles) and heated to 140° C. A dropping funnel was charged with a mixture of vinyltriethoxysilane (570 g., 3.0 moles) and di-tertiarybutyl peroxide (72 g.). The dropping funnel was inserted into the reaction flask so that the tip of the funnel was below the surface of the dimethyl phosphonate. The vinyltriethoxysilane-peroxide mixture was then added at a rate of about 5 cc. per minute. The reaction was exothermic, therefore, no external heat had to be applied during the addition to maintain the temperature at 135–145° C. Upon the completion of the addition of the vinyltriethoxysilane-peroxide mixture, the resultant reaction mixture was heated at 138–147° C. for four hours. The reaction mixture was then distilled under reduced pressure to give a greater than 60% yield of product, dimethoxyphosphinylethyltriethoxysilane (B.P. 143° C. at 5 mm. Hg, $n_D^{25}=1.4237$, specific gravity 1.067). Elemental analysis confirmed the product to be dimethoxyphosphinylethyltriethoxysilane

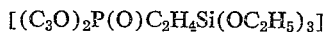

$$[(C_3O)_2P(O)C_2H_4Si(OC_2H_5)_3]$$

*Example 9*

A reaction flask was charged with dimethyl phosphonate (275 g., 2.5 moles) and heated to 140° C. A dropping funnel was charged with a mixture of methylvinyldiethoxysilane (400 g., 2.5 moles) and di-tertiarbutyl peroxide (54 g.). The dropping funnel was inserted into the reaction flask so that the tip of the funnel was below the surface of the dimethyl phosphonate. The methylvinyldiethoxysilane-peroxide mixture was then added at a rate of about 5 cc. per minute. The reaction was exothermic; therefore, no external heat had to be applied during the addition to maintain the temperature at 135–145° C. Upon the completion of the addition of the methylvinyldiethoxysilane-peroxide mixture, the resultant reaction mixture was heated at 138–147° C. for five hours. The reaction mixture was then distilled under reduced pressure to give a 50% yield of product, based on the weight of the starting materials. Elemental analysis confirmed the product to be dimethoxyphosphinylethylmethyldiethoxysilane [(CH$_3$O)$_2$P(O)C$_2$H$_4$Si(CH$_3$)(OC$_2$H$_5$)$_2$] (B.P. 133° C. at 5 mm. Hg, $n_D^{25}$=1.4300).

*Example 10*

A reaction flask was charged with dimethyl phosphonate (273 g., 2.48 moles) and heated to 140° C. A dropping funnel was charged with a mixture of phenylvinyldiethoxysilane (550 g., 2.48 moles) and di-tertiarybutyl peroxide (65.88). The dropping funnel was inserted into the reaction flask so that the tip of the funnel was below the surface of the dimethyl phosphonate. The phenylvinyldiethoxysilane-peroxide mixture was then added at a rate of about 5 cc. per minute. The reaction was exothermic; however, external heat had to be applied during the addition to maintain the temperature at 135–145° C. Upon the completion of the addition of the phenylvinyldiethoxysilane-peroxide mixture, the resultant reaction mixture was heated at 139–141° C. for ten hours with a nitrogen sparge. The reaction mixture was then distilled under reduced pressure to give dimethoxyphosphinylethylphenyldiethoxysilane.

[(CH$_3$O)$_2$P(O)C$_2$H$_4$(C$_6$H$_5$)Si(OC$_2$H$_5$)$_2$]

(B.P. 186° C. at 5 mm. Hg, $n_D^{25}$=1.4762). Elemental analysis confirmed the product to be dimethoxyphosphinylethylphenyldiethoxysilane.

*Example 11*

A reaction flask was charged with dimethyl phosphonate (161 g., 1.46 moles) and heated to 140° C. A dropping funnel was charged with a mixture of vinyldimethylethoxysilane (190 g., 1.46 moles) and di-tertiarybutyl peroxide (28 g.). The dropping funnel was inserted into the reaction flask so that the tip of the funnel was below the surface of the dimethyl phosphonate. The vinyldimethylethoxysilane-peroxide mixture was then added at a rate of about 5 cc. per minute. The reaction was exothermic; therefore, no external heat had to be applied during the addition to maintain the temperature at 135–145° C. Upon the completion of the addition of the vinyldimethylethoxysilane-peroxide mixture, the resultant reaction mixture was heated at 138–147° C. for three hours. The reaction mixture was then distilled under reduced pressure to give a 60% yield of product, dimethoxyphosphinylethyldimethylethoxysilane (B.P. 119° C. at 0.5 mm. Hg, $n_D^{25}$=1.4341; specific gravity 1.037). Elemental analysis confirmed the product to be dimethoxyphosphinylethyldimethylethoxysilane ([MeO]$_2$—P(O)—C$_2$H$_4$—Si(CH$_3$)$_2$OC$_2$H$_5$)

*Example 12*

A reaction flask was charged with dimethyl phosphonate and heated to 140° C. A dropping funnel was charged with a mixture of allyltriethoxysilane (204 g., 1 mole) and di-tertiarybutyl peroxide (25 g.). The dropping funnel was inserted into the reaction flask so that the tip of the funnel was below the surface of the dimethyl phosphonate. The allyltriethoxysilane-peroxide mixture was then added at a rate of about 5 cc. per minute. The reaction was slightly exothermic; however, external heat had to be applied during the addition to maintain the temperature at 135–145° C. Upon the completion of the addition of the allyltriethoxysilane-peroxide mixture, the resultant reaction mixture was heated at 138–147° C. for three hours. The reaction mixture was then distilled under reduced pressure to give a 57.5% yield of product, dimethoxyphosphinylpropyltriethoxysilane (B.P. 150° C. at 5 mm. Hg; $n_D^{25}$=1.4273; specific gravity 1.067). Elemental analysis confirmed the product to be dimethoxyphosphinylpropyltriethoxysilane [(CH$_3$O)$_2$P(O)C$_3$H$_6$—Si(OC$_2$H$_5$)$_3$].

*Example 13*

A reaction flask was charged with dimethyl phosphonate (220 g., 2.0 moles) and heated to 140° C. A dropping funnel was charged with a mixture of 2-butenyltriethoxysilane (434 g., 2.0 moles) and di-tertiarybutyl peroxide (52.5 g.). The dropping funnel was inserted into the reaction flask so that the tip of the funnel was below the surface of the dimethyl phosphonate. The 2-butenyltriethoxysilane-peroxide mixture was then added at a rate of about 5 cc. per minute. The reaction was slightly exothermic; however, external heat had to be applied during the addition to maintain the temperature at 135–145° C. Upon the completion of the addition of the 2-butenyltriethoxysilane-peroxide mixture, the resultant reaction mixture was heated at 138–147° C. for four hours. The reaction mixture was then distilled under reduced pressure to give a 60.5% yield of product, the beta and gamma isomers of dimethoxyphosphinylbutyltriethoxysilane (B.P. 148° C. at 5 mm. Hg; $n_D^{25}$=1.4229; specific gravity= 1.053). Elemental analysis confirmed the product to be dimethoxyphosphinylbutyltriethoxysilane

[(CH$_3$O)$_2$P(O)C$_4$H$_8$—Si(OC$_2$H$_5$)$_3$]

*Example 14*

A reaction flask was charged with dimethyl phosphonate (31 g., .28 mole) and heated to 140° C. A dropping funnel was charged with a mixture of cyclohexenyltriethoxysilane (69 g., .28 mole) and di-tertiarybutyl peroxide (8 g.). The dropping funnel was inserted into the reaction flask so that the tip of the funnel was below the surface of the dimethyl phosphonate. The cyclohexenyltriethoxysilane-peroxide mixture was then added at a rate of about 5 cc. per minute. The reaction was slightly exothermic; however, external heat had to be applied during the addition to maintain the temperature at 135–145° C. Upon the completion of the addition of the cyclohexenyltriethoxysilane-peroxide mixture, the resultant reaction mixture was heated at 138–147° C. for four hours. The reaction mixture was then stripped of all volatile materials under reduced pressure to give a 50% yield of a residue, which was identified as dimethoxyphosphinylcyclohexyltriethoxysilane. Elemental analysis confirmed the residue to be dimethoxyphosphinylcyclohexyltriethoxysilane

[(CH$_3$O)$_2$P(O)C$_6$H$_{10}$—Si(OC$_2$H$_5$)$_3$]

*Example 15*

A reaction flask was charged with diphenyl phosphonate (468 g., 2.0 moles) and heated to 140° C. A dropping funnel was charged with a mixture of vinyltriethoxysilane (380 g., 2.0 moles) and di-tertiarybutyl peroxide (67.8 g.). The dropping funnel was inserted into the reaction flask so that the tip of the funnel was below the surface of the diphenyl phosphonate. The vinyltriethoxysilane-peroxide mixture was then added at a rate of about 5 cc. per minute. The reaction was exothermic; however, some external heat had to be applied during the addition to maintain the temperature at 135–145° C. Upon the completion of the addition of the vinyltriethoxysilane-peroxide mixture, the resultant reaction mixture was heated at 160–165° C. for three hours. The reaction mixture was then stripped of all volatile materials under reduced pressure to yield diphenoxyphosphinylethyltriethoxysilane, as a residue. Elemental analysis confirmed the residue to be diphenoxyphosphinylethyltriethoxysilane [(C$_6$H$_5$O)$_2$P(O)C$_2$H$_4$Si(OC$_2$H$_5$)$_3$].

*Example 16*

A reaction flask was charged with diphenyl phosphonate (468 g., 2 moles) and heated to 140° C. A dropping funnel was charged with a mixture of methylvinyldiethoxysilane (320 g., 2 moles) and di-tertiarybutyl peroxide (63 g.). The dropping funnel was inserted into the reaction flask so that the tip of the funnel was below the surface of the diphenyl phosphonate. The methylvinyldiethoxysilane-peroxide mixture was then added at a rate of about 5 cc. per minute. The reaction was slightly exothermic; however, some external heat had to be applied during the addition to maintain the temperature at 135–145° C. Upon the completion of the addition of the methylvinyldiethoxysilane-peroxide mixture, the resultant reaction mixture was heated at 172–181° C. for 2½ hours. The reaction mixture was then stripped of all volatile materials under reduced pressure to yield diphenoxyphosphinylethylmethyldiethoxysilane, as a residue. Elemental analysis confirmed the residue to be diphenoxyphosphinylethylmethyldiethoxysilane $$[(C_6H_5O)_2P(O)C_2H_4Si(CH_3)(OC_2H_5)_2]$$

*Example 17*

A reaction flask was charged with di(2-ethylhexyl) phosphonate (306 g., 1 mole) and heated to 140° C. A dropping funnel was charged with a mixture of methylvinyldiethoxysilane (160 g., 1 mole) and di-tertiarybutyl peroxide (37.3 g.). The dropping funnel was inserted into the reaction flask so that the tip of the funnel was below the surface of the di(2-ethylhexyl) phosphonate. The methylvinyldiethoxysilane-peroxide mixture was then added at a rate of about 5 cc. per minute. The reaction was exothermic, therefore, no external heat had to be applied during the addition to maintain the temperature at 135–145° C. Upon the completion of the addition of the methylvinyldiethoxysilane-peroxide mixture, the resultant reaction mixture was heated at 138–147° C. for four hours. The reaction mixture was then distilled under reduced pressure to yield di(2-ethylhexoxy)phosphinylethylmethyldiethoxysilane ($n_D^{25}=1.4468$) as a residue. Elemental analysis confirmed the residue to be di-(2-ethylhexoxy)phosphinylethylmethyldiethoxysilane $$[(C_8H_{17}O)_2P(O)C_2H_4Si(CH_3)(OC_2H_5)_2]$$

*Example 18*

In a 1-liter flask was charged 177 grams (0.73 mole) of gamma-chloropropyltriethoxysilane and 125 grams (0.75 mole) of $(C_2H_5O)_3P$. The flask and contents were heated at the reflux of the contents (145° C.) for 22 hours. The contents were then distilled through a Vigreaux column and 111 grams of [gamma-(diethoxyphosphinyl)propyl]triethoxysilane, $$(C_2H_5O)_2P(O)(CH_2)_3Si(OC_2H_5)_3$$

The boiling point of this product was found to be 134° C.–136° C. at 1.1–1.2 mm. of mercury. The product had an index of refraction, $n_D^{25}$, of 1.4257. Elemental analysis of the product gave the following results:

|  | C | H | Si | M.W. |
| --- | --- | --- | --- | --- |
| Calculated | 45.5 | 9.06 | 8.2 | 342 |
| Found | 45.0 | 9.10 | 8.1 | 372±37 | and thus verified the product. Infra-red analysis also verified the product.

A solution containing 75 ml. ethanol, 25 ml. water, 1 gram of the product, $$(C_2H_5O)_2P(O)(CH_2)_3Si(OC_2H_5)_3$$

and 0.5 ml. of 5% aqueous KOH was allowed to stand for 20 minutes. To this solution was then added 1 g. of gamma-aminopropyltriethoxysilane to act as a sizing agent on cloth. Strips of crepe silk, nylon and India cotton cloth were each immersed in the solution for 5 minutes. The strips were then air-dried for ½ hour and then oven dried at 125° C. for ½ hour. Each strip was then placed in a controlled Bunsen burner flame. The strips of cloth treated in this manner were superior to untreated cloths and cloths treated in a similar manner but with a solution containing no product $$(C_2H_5O)_2P(O)(CH_2)_3Si(OC_2H_5)_3$$

in the following aspects:

(1) The cloth treated with the product of this example had a higher ignition temperature.

(2) The cloth treated with the product of this example had after glow quenching properties.

(3) The cloth treated with the product of this example carbonized to a much lesser extent.

*Example 19*

Di-tertiarybutyl peroxide (5 g.) is dissolved in 100 g. of a polydimethylsiloxane oil containing about 10 weight percent vinyl(methyl)siloxane units, $$(CH_2=CH)(CH_3)SiO$$

Dimethyl phosphonate (12.8 g.) is heated to 140° C. in a reaction flask. The solution of peroxide and the oil is added slowly to the dimethyl phosphonate while maintaining the temperature at 140° C. to 155° C. over a 1 hour period. The reaction mixture is then heated to 170° C. for 3 to 5 hours. The low boiling materials are then stripped from the reaction mixture under vacuum. The product is obtained as a viscous residue which is analyzed as a dmethylpolysiloxane oil containing 11.6 mole percent (dimethoxyphosphinylethyl)methylsiloxane units.

This application is a continuation of application Serial Number 782,379, filed December 23, 1958, now abandoned.

What is claimed is:

1. A process for producing organosilicon compounds containing phosphorus attached to silicon through a divalent saturated hydrocarbon group selected from the group consisting of aliphatic and alicyclic hydrocarbon groups, which comprises reacting (1) an organosilicon compound containing at least one silicon atom and at least one silicon-bonded ethylenically unsaturated group selected from the class consisting of ethylenically unsaturated aliphatic and alicyclic hydrocarbon groups, each silicon atom being bonded to 1 to 3 oxygen atoms, each of said oxygen atoms being bonded to an element from the class consisting of silicon and carbon of a monovalent hydrocarbon group and each remaining unfilled valence of each silicon atom being satisfied by a group from the class consisting of a monovalent hydrocarbon group and a halogenated monovalent hydrocarbon group, with (2) a phosphorus compound containing the phosphinidyne group, and at least one phosphorus-bonded hydrogen atom, each remaining unfilled valence of phosphorus being satisfied by a group from the class consisting of a hydrocarbyl group, a halohydrocarbyl group, a hydrocarbyloxy group and a halohydrocarbyloxy group in the presence of a free radical catalyst.

2. A process for producing (phenylphosphinoethyl)triethoxysilane which comprises reacting phenylphosphine with vinyltriethoxysilane in the presence of a free radical catalyst.

3. A process for producing (diphenylphosphinoethyl)-methyldiethoxysilane which comprises reacting diphenylphosphine with (vinyl)methyldiethoxysilane in the presence of a free radical catalyst.

4. A process for producing [butyl(phenyl)phosphinoethyl]triethoxysilane which comprises reacting (butyl)-phenylphosphine with vinyltriethoxysilane in the presence of a free radical catalyst.

References Cited in the file of this patent

UNITED STATES PATENTS 2,843,615    Linville _____ July 15, 1958